United States Patent Office 3,554,857
Patented Jan. 12, 1971

3,554,857
METHOD OF MINIMIZING DEGRADATION OF POLYESTER/RUBBER VULCANIZATES, AND PRODUCT THEREOF
Bernard C. Barton, Butler, N.J., assignor to Uniroyal, Inc., New York, N.Y., a corporation of New Jersey
No Drawing. Filed Mar. 29, 1968, Ser. No. 718,025
Int. Cl. B32b 27/36; C08c 11/66, 17/28; C08d 13/00
U.S. Cl. 161—231
4 Claims

ABSTRACT OF THE DISCLOSURE

A composite polyester fiber-reinforced vulcanized rubber article is made with a vulcanizing system comprising a sulfur-yielding vulcanizing agent, typically sulfur itself, and as an accelerator thereof a zinc phosphorodithioate, such as zinc O,O-dibutyl phosphorodithioate.

---

This invention relates to a new composite polyester fiber-reinforced vulcanized rubber article characterized by significantly reduced deterioration of the polyester fiber reinforcement upon aging at the elevated temperatures commonly encountered in use. It relates to the composite article itself as well as to the method of making the same.

It is very old to reinforce vulcanized rubber composite articles with polyester fibers. Examples of more recent U.S. patents directed to particular techniques for making such articles are Daniels 3,051,212 and Chantry 3,216,187. It has been attempted to accelerate the sulfur vulcanization of polyester fiber-reinforced rubber articles with the thiuram or the sulfenamide accelerators, the latter being what is known as "delayed action accelerators" by which is meant that after incorporation in the rubber stock they exert no accelerating action until the composite article is subjected to vulcanizing conditions of heat and pressure to give it its final form. However it has been found that such thiuram and sulfenamide accelerators have such a deleterious effect on the polyester fiber reinforcement that they cannot be used. I believe that the reason that such common vulcanization accelerators as those referred to above cause degradation of the reinforcing polyester fiber in polyester-reinforced articles is that they result in the formation of a basic environment around the reinforcement and that this basic environment developed by the curing system accelerates hydrolytic degradation and/or chain scission of the polyester molecules which in turn causes unduly high or rapid degradation in physical properties of the reinforcement when the composite article is placed in service. Such degradation is accentuated when the article is subjected to elevated temperatures in service; such elevated temperatures may be attributable to the internal heat generated by repeated flexure as in the case of a pneumatic tire or a belt or may be due to environmental heat or both.

My invention is based on the discovery that the above-described undesired degradation of polyester fiber reinforcement in vulcanized rubber composite articles upon heat aging can be greatly reduced by vulcanizing the rubber in such articles with a vulcanizing system composed of sulfur, or other sulfur-yielding vulcanizing agent known to the art, and, as a vulcanization accelerator, a zinc phosphorodithioate of the formula

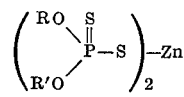

where R and R' are organic (hydrocarbyl) radicals containing less than 19 carbon atoms selected from the group consisting of alkyl (typically n-alkyl of 1–8 carbon atoms), alicyclic, alkenyl and aralkyl radicals. Examples of such accelerators are those shown in U.S. Pat 3,308,-103. Other accelerators within the above definition, e.g. zinc O,O-dibutyl (typically di-n-butyl) phosphorodithioate and zinc O,O-dicyclohexyl phosphorodithioate may be used.

The determination of the amount of sulfur or sulfur-yielding vulcanizing agent used in the curing system of my invention will be well within the skill of those versed in compounding rubber. The amount should be limited so as to give a soft flexible rubbery vulcanizate. Typically I use from 1 to 5 parts by weight per 100 parts of rubber used.

The amount of the zinc phosphorodithioate accelerator used can be varied widely. Again the determination of the amount of this agent will be within the skill of the art. Typically I use from 5 to 10 parts by weight per 100 parts of rubbery polymer(s) used.

My curing system is applicable to any sulfur-vulcanizable rubbery polymer or blend of polymers. It is applicable to the highly unsaturated rubbers such as SBR, cis-BR (cis-1,4-polybutadiene), IR (both natural rubber and synthetic polyisoprene), and various mixtures of the foregoing polymers, as well as to butadiene-acrylonitrile rubbery copolymers.

My system is also applicable to the low or slightly unsaturated rubbers such as butyl rubber and EPDM rubbers which are terpolymers of ethylene, propylene and a non-conjugated diene. The diene in the EPDM rubber is preferably dicyclopentadiene, 1,4-hexadiene, methylene norbornene or ethylidene norbornene.

As is well-known to those skilled in compounding rubber, the rubber stock will usually also comprise other conventional compounding ingredients such as reinforcing carbon black, extender oil, zinc oxide, stearic acid, antioxidants, antiozonants, etc.

Any polyester fibers known to the art to be useful for reinforcing rubber can be used. Typically the polyester is a "linear terephthalate polyester" as that term is defined in Daniels U.S. 3,051,212. Examples of such polyester fibers are those described in the Daniels patent and in Chantry U.S. 3,216,187; I am not limited to using fibers of the type described in those patents but can use any polyester fiber suitable for reinforcing rubber.

My invention can be used in the production of any polyester fiber-reinforced vulcanized rubber composite article such as pneumatic tires, V-belts, flat belts, "Timing"® belts (toothed power or synchronizing belts), footwear, coated fabrics, rubberized-fabric containers etc.

In practicing my invention care should be taken that thiuram- and sulfenamide-type accelerators are omitted from the rubber stock surrounding the polyester fiber reinforcement and also from any rubbery components attached to such surrounding stocks in such proximity that migration of those accelerators (or their decomposition products formed at elevated temperatures) into contact with the polyester fiber would occur. Thus, in making pneumatic tires it is essential to omit such accelerators from the carcass and sidewall stocks; ideally, those accelerators would also be excluded from the tread stock as well.

The following example compares the practice of my invention with conventional practice using a sulfenamide-accelerated sulfur-vulcanized carcass stock.

EXAMPLE

Two tire carcass stock formulations A and B, were made from the following black masterbatch, MC:

Masterbatch, MB

| | |
|---|---:|
| Smoked sheet | 45.0 |
| SBR 8214 [1] | 82.5 |
| FEF carbon black | 55.0 |
| "Circosol 2XH" hydrocarbon extending oil [2] | 2.5 |
| Pine tar [3] | 5.0 |
| Stearic acid | 1.0 |
| Zinc oxide | 5.0 |
| "Antioxidant 2246" [4] | 1.0 |
| Total | 197.0 |

[1] Cold, easy processing styrene/butadiene copolymer extended with 50 parts per 100 parts of rubber of light-colored naphthenic oil prepared with mixed acid emulsifier, non-staining and non-discoloring antioxidant and salt acid coagulated. Bound styrene is 22.5 to 24.5% with a raw polymer ML-4 viscosity range at 212° F., of 37 to 45.
[2] Naphthenic petroleum fraction of high molecular weight, low volatility having a specific gravity of 0.94, and a Saybolt universal viscosity of 83 seconds at 210° F.
[3] Pine tar oil. Specific gravity about 1.025. Furol viscosity at 50° C., about 15 seconds. Resin content, about 15%.
[4] 2,2'-Methylenebis(4-methyl-6-tertiary-butylphenol).

The above masterbatch was used to formulate the two tire carcass compounds (having essentially the same modulus) as follows:

| | Comparison stock A | Stock B (the invention) |
|---|---:|---:|
| MB | 197.0 | 197.0 |
| N-cyclohexyl-2-benzothiazole sulfenamide | 1.0 | |
| Zinc O,O-dibutyl phosphorodithioate | | 7.0 |
| Sulfur | 3.0 | 3.0 |
| Properties after curing 30 minutes at 320° F.: | | |
| Shore durometer A | 54 | 52 |
| Stress, p.s.i., at 300% elongation | 1,100 | 1,200 |
| Tensile strength, p.s.i. | 2,300 | 1,500 |
| Elongation, percent | 500 | 350 |

Twenty "Dacron 68" polyethylene terephthalate 840 denier/3 ply grey tire cords, each about 19 inches long, were placed between two 0.10 inch thick uncured slabs of the above stocks into a mold measuring 2 inches wide, 12 inches long and .2 inch thick. The composite was then cured for 30 minutes at 320° F. After this cure, the resulting pads were aged in a circulating air oven at three different temperatures for lengths of time sufficient to produce an easily measurable loss in intrinsic viscosity of the polyester tire cord. The times and temperature of aging used were: 2 hours at 400° F., 6 hours at 350° F., and 22 hours at 300° F. The pads containing sulfenamide accelerator were aged side by side with pads containing the phosphorodithioate accelerator to allow a direct comparison between the two accelerators.

The results obtained were:

| | Comparison stock A | Stock B (the invention) |
|---|---:|---:|
| Intrinsic viscosity of tire cord fiber before cure | 0.835 | 0.835 |
| Intrinsic viscosity of tire cord fiber after cure | 0.808 | 0.798 |
| Intrinsic viscosity of tire cord after aging for: | | |
| 2 hours at 400° F | 0.599 | 0.696 |
| 6 hours at 350° F | 0.690 | 0.733 |
| 22 hours at 300° F | 0.743 | 0.762 |

The effect of the different accelerator systems is expressed in terms of loss in intrinsic viscosity per hour, under the three different aging conditions, using the intrinsic viscosity *after* cure as the initial intrinsic viscosity of the polyester tire cord fiber, as follows:

| | Intrinsic viscosity, loss per hour | |
|---|---:|---:|
| | Comparison stock A | Stock B (the invention) |
| Aging: | | |
| 2 hours at 400° F | 0.105 | 0.051 |
| 6 hours at 350° F | 0.020 | 0.011 |
| 22 hours at 300° F | 0.0030 | 0.0016 |

It is obvious from the above data that the phosphorodithioate accelerator stock retards the breakdown of the tire cord in a typical tire carcass stock by about 100 percent.

While the polyester fiber used in the above example was used in the "grey" or undipped form, it will be understood by those skilled in the art that the polyester fiber reinforcement can if desired be dipped in known dipping solutions to enhance the adhesion thereof to the rubber. It will also be understood that the rubber compound in which the polyester fiber reinforcing is embedded may contain known chemicals to increase the strength of the adhesion of rubber to polyester reinforcement.

I claim:

1. In a composite structure comprising vulcanized rubber reinforced with a fibrous structure prepared from a linear terephthalate polyester, said rubber being vulcanized with a sulfur-yielding vulcanizing agent, the improvement comprising accelerating the rubber vulcanization with a zinc phosphorodithioate of the formula

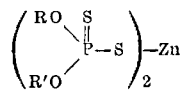

where R and R' are organic radicals containing less than 19 carbon atoms selected from the group consisting of alkyl, alicyclic, alkenyl and aralkyl radicals, said rubber containing no accelerators which form a basic environment around the polyester reinforcement.

2. In a method which comprises vulcanizing a composite structure comprising rubber reinforced with a fibrous structure prepared from a linear terephthalate polyester, a sulfur-yielding vulcanizing agent and an accelerator, the improvement comprising accelerating the vulcanization with a zinc phosphorodithioate of the formula

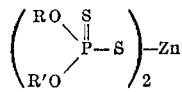

where R and R' are organic radicals containing less than 19 carbon atoms selected from the group consisting of alkyl, alicyclic, alkenyl and aralkyl radicals.

3. The structure of claim 1 wherein the zinc phosphorodithioate is zinc O,O-dibutyl phosphorodithioate.

4. The method of claim 2 wherein said zinc phosphorodithioate is zinc O,O-dibutylphosphorodithioate.

References Cited

UNITED STATES PATENTS

| | | | |
|---|---|---|---|
| 3,051,212 | 8/1962 | Daniels | 152—330 |
| 3,308,103 | 3/1967 | Coran et al. | 260—79.5 |
| 3,388,083 | 6/1968 | Kwok | 260—873 |
| 3,400,106 | 9/1968 | Morita | 260—779 |

OTHER REFERENCES

Defensive Publication, class 260/873, 8620.6.23, (748,-659) published May 6, 1969, Leibu.

WILLIAM H. SHORT, Primary Examiner

E. WOODBERRY, Assistant Examiner

U.S. Cl. X.R.

152—330; 156—110; 161—239, 247, 255; 260—79.5, 779, 873